(12) United States Patent
Sohm

(10) Patent No.: US 9,372,682 B2
(45) Date of Patent: Jun. 21, 2016

(54) PARALLEL PROGRAMMING AND UPDATING OF LIGHTING BUS SUBSCRIBERS

(75) Inventor: Stefan Sohm, Dornbirn (AT)

(73) Assignee: Tridonic GmbH & Co. KG, Dornbirn (AT)

( * ) Notice: Subject to any disclaimer, the term of this patent is extended or adjusted under 35 U.S.C. 154(b) by 0 days.

(21) Appl. No.: 13/818,560

(22) PCT Filed: Aug. 26, 2011

(86) PCT No.: PCT/EP2011/064690
§ 371 (c)(1),
(2), (4) Date: Apr. 18, 2013

(87) PCT Pub. No.: WO2012/028541
PCT Pub. Date: Mar. 8, 2012

(65) Prior Publication Data
US 2013/0205288 A1    Aug. 8, 2013

(30) Foreign Application Priority Data

Aug. 31, 2010 (DE) .................... 10 2010 039 921 U
Oct. 27, 2010 (DE) .................... 10 2010 043 011 U

(51) Int. Cl.
*G06F 9/44* (2006.01)
*G06F 9/445* (2006.01)
*G05B 15/02* (2006.01)
*G06F 11/30* (2006.01)

(52) U.S. Cl.
CPC .................. *G06F 8/65* (2013.01); *G05B 15/02* (2013.01); *G06F 11/3013* (2013.01); *G06F 11/3051* (2013.01)

(58) Field of Classification Search
CPC ......... H04L 67/10; H04L 67/32; G06F 21/78; G06F 21/575; G06F 11/1471
USPC .................................. 717/168–173, 174–178
See application file for complete search history.

(56) References Cited

U.S. PATENT DOCUMENTS

| 7,844,945 | B2 * | 11/2010 | Bhagia et al. ................. 717/107 |
| 2008/0098094 | A1 * | 4/2008 | Finkelstein et al. .......... 709/220 |
| 2008/0184151 | A1 * | 7/2008 | Agarwal et al. ............... 715/772 |
| 2008/0313627 | A1 * | 12/2008 | Segawa .......................... 717/171 |
| 2010/0070961 | A1 * | 3/2010 | Auer et al. ..................... 717/168 |
| 2010/0122245 | A1 | 5/2010 | Igarashi et al. |

(Continued)

OTHER PUBLICATIONS

International Search Report issued in connection with the corresponding International Application No. PCT/EP2011/064690 on Jan. 5, 2012.

*Primary Examiner* — Lewis A Bullock, Jr.
*Assistant Examiner* — Jacob Dascomb
(74) *Attorney, Agent, or Firm* — The H.T. Than Law Group

(57) ABSTRACT

The invention relates to a method for programming lighting bus subscribers, comprising the steps of: determining available lighting bus subscribers, e.g. sensors and/or actuators such as for example operating devices for lighting means, by a central unit connected to the lighting bus subscribers via a bus; selecting, by means of the central unit, at least one lighting bus subscriber from the available lighting bus subscribers; setting the selected lighting bus subscribers into an update mode and allocating an update identification to the lighting bus subscribers; and transferring update software, in particular firmware, provided with the update identification to the selected lighting bus subscribers.

27 Claims, 4 Drawing Sheets

(56) References Cited

U.S. PATENT DOCUMENTS

| | | | |
|---|---|---|---|
| 2010/0325622 A1* | 12/2010 | Morton | 717/168 |
| 2011/0246977 A1* | 10/2011 | Parsons et al. | 717/171 |
| 2011/0321024 A1* | 12/2011 | Knothe et al. | 717/168 |
| 2013/0212574 A1* | 8/2013 | Hutchinson et al. | 717/172 |
| 2014/0089912 A1* | 3/2014 | Wang et al. | 717/173 |

\* cited by examiner

PARALLEL PROGRAMMING AND UPDATING OF LIGHTING BUS SUBSCRIBERS

INTRODUCTION

The present invention relates to a method for programming and updating software statuses, especially firmware, of lighting bus users by means of update software.

Lighting bus users are understood to be, e.g., devices connected via a bus, especially via a two-wire bus, such as, e.g., sensors, actuators such as especially operating devices for light-emitting means and user interfaces. Naturally, other lighting bus users can also be updated which are operated and/or driven at least partially by means of software.

BACKGROUND OF THE INVENTION

To eliminate errors in the firmware of a lighting bus user or for providing new/other features at the lighting bus user, it may be desirable to replace the firmware, that is to say the software by means of which the lighting bus user is operated and/or controlled, with a new or different firmware software status (software update using update software). However, the method described is not restricted to updating firmware but can also be used for updating other software components of the lighting bus user.

From WO 2006/066884 A1, a method for programming an individual operating device for light-emitting means is known in this context in which the firmware of an operating device for light-emitting means is updated or changed, respectively, via an interface.

In comparison, the present invention relates especially to the parallel updating of a multiplicity of lighting bus users.

For this purpose, lighting bus users available at a bus are determined, e.g. by a connected central processing unit, and subsequently lighting bus users are selected which are intended to be updated. In this context, the available lighting bus users can be combined for an update in accordance with various criteria. For example, lighting bus users of the same type are divided into classes. The invention then allows software updates to be provided for a multiplicity of different lighting bus users, e.g. for all lighting bus users of different classes, efficiently transmitted and imported to the respective lighting bus users.

In this context, the lighting bus users are connected to one or more central processing units via which the update process is controlled. In particular, individual or several lighting bus users, one or more lighting bus user classes or also all connected lighting bus users can be selected for an update via the central processing unit. The central processing unit can provide an update software, i.e. a computer program product, by means of which lighting bus users can be operated, and transmit this software update to the selected lighting bus users.

Transmitting the update software, which will be described in greater detail in the text which follows, can be controlled by a user in order to establish, for example, when update software is to be imported to a selected lighting bus user. Thus, for example, it can be established that certain lighting bus users are to be supplied with the update software at night or within certain periods of time. In this context, the central processing unit can also predict, e.g., how much time is consumed by importing update software to the selected lighting bus users. If the time determined is, e.g., outside an available time window, the central processing unit can divide the importing of the update software over several time windows or propose such a division to a user.

In a first step, the central processing unit can identify and list lighting bus users. After that, the update software is imported, e.g. block by block, via the bus to the lighting bus users previously selected by means of an update identification (update ID) issued by the central processing unit for a software update.

During a block-by-block transmission of the update software, it is determined, after one block has been transmitted, which bus users have received the block correctly. If a disturbance occurs during the transmission of the update software in the case of one or more lighting bus users, only the blocks received defectively or not received will be retransmitted in a subsequent step.

During the transmission of the software update to the selected lighting bus users, the lighting bus users which are not updated can continue to be operated regularly and controlled by control commands transmitted via the bus.

Each selected lighting bus user is identifiable by an unambiguous ID. The unambiguous ID can be read out by the lighting bus user. A detection service, a so-called poll manager, which is executed, for example, on the central processing unit, identifies all devices connected to the bus so that a list of all connected devices can be set up for a user. The user then determines tasks by means of which it is determined which lighting bus users are supplied with a software update.

In this context, lighting bus users can be selected as already mentioned. Similar lighting bus users, i.e. lighting bus users which have, e.g., similar hardware and can therefore be updated with the same update software, can be provided with a single update identification and/or combined in lighting bus user classes. Lighting bus users of one class are then supplied with update software whilst other lighting bus users/lighting bus user classes can be supplied with other software updates.

The lighting bus users can also be selected in accordance with their location/their position in a building. It is thus possible, e.g., to provide all lighting actuators (operating devices for light-emitting means) on one storey with update software whilst lighting actuators at another location are not updated. A selection according to other criteria is also possible. Thus, for example, lighting bus users in different rooms (e.g. unrented rooms in a hotel) can also be selected for a software update.

The user can provide a configuration for the software update depending on the task. Such a configuration can consist in specifying additional parameters for the software update. In addition, it can be specified which software version the selected lighting bus users are to be updated to also in dependence on the software status already present.

After the task has been created, a control program, an update tool, executed on the central processing unit sends out, e.g., an initialization command with the unambiguous update identification to each of the selected lighting bus users. By means of the update identification, the lighting bus users which are to be updated with the software update can be placed into a so-called boot loader mode. In this context, the update identification can differ from task to task.

After sending out the initialization command, the central processing unit begins with transmitting a software update, i.e. with the, e.g., block-by-block transmitting of the update software to the selected lighting bus users. In this context, the update software does not need to be present in the central processing unit but can also be stored in a connected storage medium or a memory also connected to the bus.

In the block-oriented transmission, data are periodically transmitted which comprise software update data and the update identification. By this means, each lighting bus user on the bus can detect whether received data are to be evaluated or can be discarded. Data are sent out until all software update data have been transmitted. After conclusion of the transmission, a check takes place in each lighting bus user which is terminated with an update end message to the central processing unit.

In this process, e.g., a checksum is calculated at the lighting bus user and transmitted to the central processing unit. By means of the checksum information, the central processing unit can determine whether a lighting bus user has received the entire software update correctly. The data or blocks are also provided with checksum information and on reception of data by a lighting bus user it is thus possible to determine whether the lighting bus user has received sent data correctly. After the reception of data/blocks, a message/return message can then be sent to the central processing unit. In this message, it is possible to convey whether the transmission was successful or not.

By means of the return message of the lighting bus users, the central processing unit can indicate blocks received correctly and log blocks not received correctly and display corresponding information to the user.

By means of the method described, lighting bus users of different classes can be supplied in parallel with software updates. As a precursor to the software update, the tasks can be prepared which are then performed automatically by the central processing unit. Due to the checking of individual blocks in the block-oriented transmission, a correct transmission can be determined. It is also possible to determine blocks transmitted incorrectly and only to retransmit the blocks transmitted incorrectly to the lighting bus user.

The invention is therefore based on the object of providing a novel option for updating lighting bus users.

BRIEF DESCRIPTION OF THE INVENTION

This object is achieved by the invention claimed by means of the independent claims. Developments of the present invention are the subject matter of the subclaims.

According to a first aspect of the invention, a method for programming lighting bus users is specified, comprising the steps: determining available lighting bus users, e.g. sensors and/or actuators, by means of a central processing unit connected to the lighting bus users via a bus, selection by means of the central processing unit of at least one lighting bus user from the available lighting bus users, placing the selected lighting bus users in an update mode, allocating an update identification (update ID) to the lighting bus users and transmitting update software, particularly firmware, provided with the update identification, to the selected lighting bus users.

Lighting bus users are understood to be:
  operating devices for light-emitting means such as, e.g.,
    gas discharge lamps, LEDs, OLEDs, halogen lamps etc.
  sensors such as, e.g., motion, smoke or light sensors
  and
  control units, possibly designed as user interface (e.g. dimmers, touch screen, etc.)

It is possible to determine whether the update software has been transmitted faultlessly in each case.

A lighting bus user can be placed into an operating mode as soon as the update software has been transmitted faultlessly and written completely.

A lighting bus user can be operated in the update mode by a boot loader.

The update software can be transmitted block by block.

It is possible to determine whether the update software/update software blocks has/have been transmitted faultlessly and the result of the determination can be logged for each selected lighting bus user.

After conclusion of the transmission of the entire update software, the update software or the update software blocks can be retransmitted to the lighting bus users for which a transmission has been logged which was not faultless/did not take place.

Selected lighting bus users can be programmed in a time-controlled manner.

The lighting bus users can be selected in accordance with type, hardware version and/or position/mounting location.

The selection of the lighting bus users can comprise lighting bus users of different type.

To each lighting bus user type, an update identifier can be assigned.

Update software can be transmitted for each lighting bus user type.

The update software/update software blocks transmitted for a lighting bus user can be written into a buffer of the lighting bus user and the buffer can accommodate at least more than one block.

In each case all update software blocks present in a buffer of a lighting bus user can be written into an update software memory.

All update software blocks present in the buffer can be written into the update software memory before new update software blocks are received.

After writing the update software/one or more update software blocks, a return message about the success of the writing can be transmitted to a central processing unit.

The boot loader of a lighting bus user can check a faultlessness of the update software, e.g. by determining and/or comparing a checksum, after successful writing of the update software/all update software blocks.

According to a further aspect, the invention provides a lighting bus user comprising: a first storage area in which a boot loader is stored, a second storage area for accommodating update software, a means for receiving data, a means for transmitting data.

The lighting bus user can have a buffer for accommodating update software or update software blocks.

The update software can place the lighting bus user into an update mode on receiving of an initialization command.

The boot loader can receive an update identification.

The boot loader can determine by means of an update identification, a hardware ID and/or on the basis of other parameters whether received update software/received update software blocks is/are intended for the lighting bus user or not.

The boot loader can be active in the update mode and receive and write update software/update software blocks from a central processing unit into the second storage area.

The boot loader can check whether the update software has been received faultlessly.

The boot loader can transmit a return message to a central processing unit which indicates a non-faultless transmission of the update software/update software blocks.

In a further aspect, the invention provides a computer-based central processing unit which is configured for executing control software, determining available lighting bus users, determining suitable update software for the lighting bus users determined, providing a user interface for selecting lighting bus users, placing selected lighting bus users into an update mode by transmitting an initialization command and transmitting update software to the selected lighting bus users.

The computer-based central processing unit can also be configured for receiving messages/return messages about the transmission of the update software.

The computer-based central processing unit can also be configured for logging messages about the transmission of the update software.

The update software can be transmitted in update software blocks.

The computer-based central processing unit can also be configured for placing the corresponding lighting bus user into an operating mode after successful transmission of the update software/update software blocks.

The computer-based central processing unit can also be configured for retransmitting unsuccessfully transmitted update software/update software blocks to corresponding lighting bus users.

The update software can be transmitted in a timed manner.

The computer-based central processing unit can assign an update identification to each lighting bus user type.

The computer-based central processing unit can transmit update software for each lighting bus user type.

Finally, the invention provides a system of at least one lighting bus user, as described above, and one computer-based central processing unit, as described above, which is configured for executing a method as described above.

BRIEF DESCRIPTION OF THE FIGURES

FIG. 4b shows a flowchart which illustrates the "perform updating" step from FIG. 4a.

DETAILED DESCRIPTION OF THE INVENTION

Figure 1:
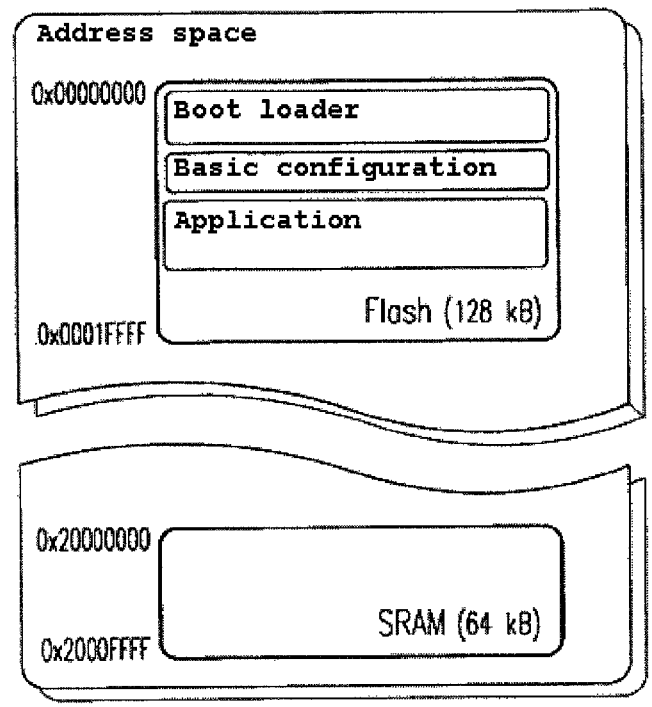
FIG. 1 shows an exemplary division of the memory of a lighting bus user into a memory for the boot loader, firmware (update software/application) and RAM memory.

The invention allows lighting bus users to be used, the software of which can be updated and which thus do not need to be exchanged because of error corrections or for providing functional extensions.

For this purpose, a lighting bus user must be equipped with a boot loader which allows a software update of the firmware. To the extent to which a software update of the firmware with update software is mentioned in the text which follows, it should be understood that software updates of other software, especially of an application, can also be performed correspondingly and other software components can also be updated. In this context, updating of the firmware is also called "flashing" which, in particular, means writing out the update software into a memory provided for the update software.

Firstly, the hardware-oriented aspects of the boot loader will be described.

The boot loader is implemented as generically as possible so that it can be adapted easily for various hardware platforms. In this context, at least small adaptations of the boot loader can be performed, and thus device-specific boot loaders can be generated, for each lighting bus user.

For the basic actuation of the hardware for which it is used, the boot loader uses a hardware abstraction layer (HAL) on which the firmware/the application is based.

There can also be corresponding drivers for different hardware variants (e.g. LM3SXXX controller versions, . . . ). The boot loader can also comprise protocol implementations for different supported interfaces (serial, Ethernet, USB, . . . ) and low-level routines for accessing various hardware elements. The boot loader can also access protocols already existing (e.g. a protocol stack for the Luxmate bus).

The boot loader also has access to a memory (e.g. a flash memory) and offers corresponding functions to the firmware for accessing this memory. For a software update, the boot loader accesses the memory via a memory control and its registers. In this arrangement, one or more of the following functions are available, among other things:

choosing a time for the updating suiting a clock frequency of a processor used, deleting a memory page (e.g. a one kilobyte (kB) large flash memory page), writing a block into the memory.

In this process, the block can begin, e.g., with an address divisible by four and have a length of a multiple of 4 bytes. It can then be provided to write twice into a memory address at a maximum before a corresponding memory page for the memory address is deleted.

It is also provided to protect the memory for the firmware in blocks against accidental overwriting. In this context, it must be noted, however, that in the case of persistent storage of the protection, the boot loader may no longer be updatable since the write protection cannot be reversed. For this reason, it is provided to set the write protection by the boot loader with each reset of the lighting bus user and to refrain from persistent storage. The protection can be activated by setting a value in a register.

To signal a current boot loader operating state, a signaling means, e.g. an LED, is preferably provided in the lighting bus user. By this means, a state of the software executed on the lighting bus user can be signaled, e.g. whether the firmware is defective and/or the boot loader is actively waiting for a software update. This can be done, e.g., by a visually and/or audibly perceptible signal. A signal which can be distinguished from this is generated if the boot loader has been placed into an initialization state via an initialization command.

In the lighting bus user, a number of storage units and/or storage areas can be provided. Generally, boot loader and firmware share one memory (e.g. flash memory) in which the program code of both components and any other parameters (e.g. configurations) are stored. During the operation, a further memory (e.g. RAM memory, SRAM) or memory area is then available for executing the boot loader or the firmware, respectively, the components normally being executed exclusively. An exemplary memory division is shown in FIG. 1.

It should be noted that protective measures have been taken which prevent the two components from overwriting one another.

So that the boot loader of a lighting bus user can be addressed individually and can provide relevant information for a software update, it must provide certain information independently of the firmware/application operating.

These are, e.g.:

version number of the boot loader and of a boot loader protocol, serial number (base-P number) of the lighting bus user for enabling the boot loader to receive addressed data via the serial number, a hardware ID in order to be able to decide whether a software update is suitable for the current lighting bus user and to be able to reject unsuitable software updates, a size of the memory in order to be able to reject invalid memory addresses for a software update, a starting address of the firmware area in order to be able to calculate a checksum, the size of the update software in order to specify the memory area into which the update software is written, a checksum of the firmware in order to check with each start of the controller whether valid firmware is present by comparing a checksum which, e.g., is stored and/or transmitted in the boot loader with a checksum of the firmware, an entry point of the firmware to enable the firmware to start.

So that suitable update software is loaded into a device, the hardware used, the software currently present and its current configuration must be noted. For example, it must be avoided to load update software for a lighting bus user onto a lighting bus user having completely different I/O circuitry.

However, lighting bus users having the same hardware can also be converted into other devices having the same hardware by means of a software update. For example, an IR receiver can be converted into an AWS sensor if the basic hardware is prepared for it, i.e. a functionality can be changed correspondingly.

Apart from the boot loader and the firmware, a basic configuration can also be stored on the lighting bus user and protected against accidental overwriting. The basic configuration can be empty/uninitialized after a software update. If necessary, the firmware/update software can determine particular values for the basic configuration under certain conditions, e.g. the first start after the software update process. Values contained in the basic configuration are, e.g., a P number, a module ID, a hardware status and possibly an MAC address in the case of Ethernet-capable devices. For example, one kilobyte can be provided for a basic configuration. The firmware/update software can also overwrite the basic configuration after a restart. It is also provided to store a backup copy of the basic configuration in another memory area in order to be able to restore the basic configuration in the case of a fault.

To enable the basic configuration to be stored as efficiently as possible, it can be provided to deposit key value pairs sequentially in memory pages and in each case to append changes until the memory page is full or a restart is executed. In this context, the key value pair written last can be defined as current. In this context, a check number (magic number) can be changed as soon as data are appended. An incorrect check number can also indicate a defect.

If a memory page is fragmented, the key value pairs can be copied into another memory page. If the memory page is defective, value key pairs can be copied into the defective page from a backup copy or another memory page (defective here designates faulty storage of key value pairs). A search for a key pair can be terminated when a special designated key pair has been found.

In order to enable keys not stored in gaplessly ascending manner to be accessed efficiently, key value pairs can be temporarily stored in the RAM memory. This procedure has the advantage that it is not necessary to delete and rewrite a memory page with each modification. This results in a speed advantage when a number of key value pairs are modified.

In the boot loader, as few commands as possible are implemented in order to save storage space for the update software/application. However, e.g. commands for testing the respective lighting bus user can be implemented in the boot loader.

If a lighting bus user has a number of boot loaders and firmware, it is also provided to update the firmware of individual components of one or more lighting bus users separately.

It can also be provided to update the firmware incrementally so that it is not the entire firmware but only parts thereof which are to be updated during a software update.

It can also be provided to provide a mechanism by means of which interrupted updating can be resumed again. Preferably, however, it is logged for the block-oriented transmission which blocks have been written successfully and which have not. It is only blocks which have not been written successfully which must then be written again. It can also be provided that the lighting bus user also logs which parts of the update software have been written successfully. By this means, it is possible to enquire at the lighting bus user itself whether and to what extent the updating has been performed and which data have to be retransmitted.

At the beginning of an updating process, the boot loader or the firmware/application of the lighting bus user receives an initialization command which activates the boot loader and assigns an update identification (update ID) to the lighting bus user. Following this, the lighting bus user changes to the boot loader mode. The boot loader stores the update identification for subsequent commands. The update identification defines which update software is provided for the lighting bus user. For example, various classes of lighting bus users can be provided with different update identifications in order to update these in parallel with a software update but different update software. However, as already described above, all, individual ones or classes/groups of lighting bus users can also be selected.

If a boot loader does not receive part of update software for a certain time after the initialization, the boot loader restarts the firmware/application already present. The boot loader itself can be updated only via a special method since, for example, a power failure during the boot loader updating would render the corresponding lighting bus user unusable.

Furthermore, a reset command is available which can also be transmitted together with the update identification in order to be able to abort an update process.

There is also a command available for checking boot loader information. In this context, the version of the firmware/application can be checked already before placing the controller into the boot loader mode. Following an enquiry command, the boot loader can transmit corresponding information, e.g. to the central processing unit.

The boot loader also provides a write command by means of which the update software/update software blocks are written into the memory (area) provided for this purpose. The data transmitted are transmitted compressed (e.g. using RLE) and provided with a prefix and a trailer. By this means, e.g., repetitive byte sequences can be coded without sending them explicitly. Due to the compression, more data can thus be transmitted at once. At the start of the software update, the firmware/application can also be marked as invalid so that in the case of an incorrect update, the lighting bus user remains in the boot loader mode and the firmware does not start even after a reset. After a successful update process, it can also be stored that an update process has taken place. By this means, special functions can be executed, e.g. with a restart, e.g. updating of the basic configuration.

Since the update of lighting bus users takes place via a bus, it is required to perform an appropriate adaptation of the transmission rate in the case of simultaneous/parallel update processes on a number of devices. It is especially the influence of the update speed at the lighting bus user without confirmation by the corresponding devices which presents problems here since there is no indication whether the update software is sent too quickly to the respective lighting bus users. If the update software is sent too quickly, it may be that devices cannot accept new data.

The present invention solves this problem in that data transmission and actual writing of the software update into the corresponding memory of the lighting bus user are decoupled from one another. Depending on storage space, several data blocks can be transmitted at a time without the acceptance of the update software blocks being delayed by the execution of update routines at the lighting bus users. The software update can only be written following a separate request. Devices which are finished with the software update report with a message, e.g. at the central processing unit. The latter waits with a new transmission until answers are present from all devices to be updated or time has been exceeded. In this context, the answers of the devices to be updated can be success messages or error messages.

The central processing unit registers error messages or time transgressions, but there is no immediate attempt at repetition so that the updating of the remaining devices is not delayed. Incorrect software updates are dealt with later when devices already successfully updated have been released again from the boot loader mode.

For the bus not to become a bottleneck, the number of messages received from the devices must amount to a small portion in comparison with the update software to be transmitted. For this reason, a relatively large buffer, e.g. 4-8 kilobytes, is provided in the lighting bus users. This reduces the number of updating processes at the lighting bus users. It is possible to transmit several update software blocks before writing of the software update is started at the lighting bus user. With a size of the buffer of, e.g., 8 kilobytes, update software can thus be transmitted, e.g., in 8 steps and written into the respective memory if the update software has a size of 64 kilobytes.

If a lighting bus user has a number of addresses via which it can be addressed by the central processing unit, it is provided that the lighting bus user always responds to an updating request with only one predetermined address in order to prevent multiple transmission of the software update to the lighting bus user.

On the central processing unit, control software can be executed which checks and controls the software updating.

The control software provides the user, for example, with a graphical user interface via which the user can select which devices are to be updated. The devices available on the bus and their types and, for example, hardware and/or software versions are determined by the control software by polling the bus. In this context, it is also provided that in the case of lighting bus users the firmware of which is no longer operating and which are in the boot loader mode, a message can also be returned to the control software. From the responses received, the control software creates a list of the lighting bus users available on the two-wire bus. The responses to the control software contain, for example, a hardware ID, on the basis of which the control software can generate a list of compatible update software versions for a hardware base identified by the hardware ID. In the case of lighting bus users which operate correctly, the firmware can also return further additional information.

So that the control software can determine which update software versions are compatible with a lighting bus user, the following data are stored in the update software, for example:
the hardware IDs for which the update software can be used,
an accurate device designation,
an accurate update software identification,
a version number of the update software,
a checksum,
information on the size of the update software (number of bytes of the update software),
a block size supported at a maximum (as an alternative, this can also be predetermined by the update software data divided into suitable blocks) and/or
the actual update software data.

Once the control software has determined all lighting bus users available on the bus, the data found can be displayed to the user. By means of the information shown, the user can then select individual lighting bus users or also classes/groups of lighting bus users for a software update by means of suitable/selected update software versions. The control software then determines by means of a version test whether a software update is appropriate at all, e.g. from which firmware to which other one firmware can be updated at all.

A software update can thus comprise one or more of the following steps:
selection of the lighting bus users to be updated in the software controller,
selecting an updating function,
polling of the lighting bus users available on the bus by the control software,
receiving the responses from the lighting bus users on the bus by the control software, each of the lighting bus users supplying an address,
forming a cut set of the selected lighting bus users and the lighting bus users which have responded to the polling by the control software,
representing the lighting bus users which can be updated, wherein the lighting bus users which cannot be updated can also be represented distinguishably from those,
starting the updating process after confirmation by the user, wherein the user can also specify that the software updating should take place at a particular time,
logging the progress of the updating process/updating processes for determining which updating of which lighting bus user is (partially) successful/faulty.

Figure 2:
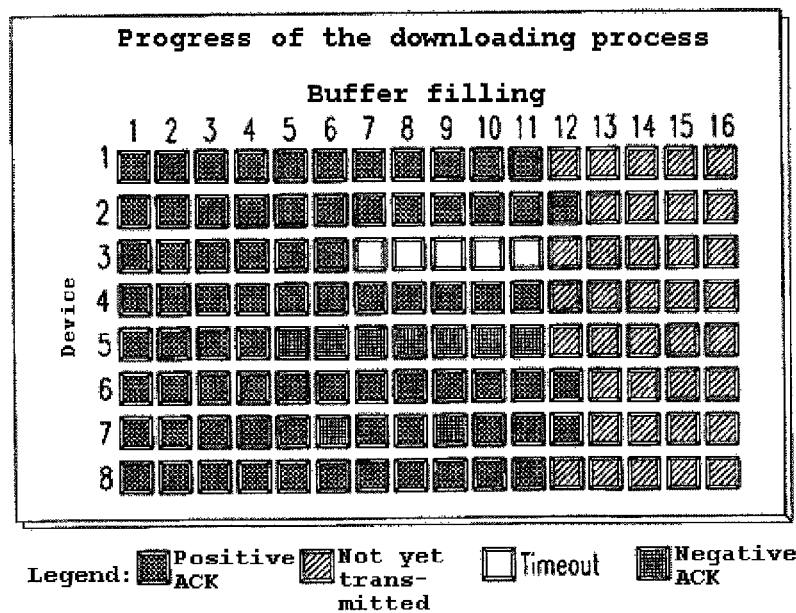
FIG. 2 shows an exemplary representation of logging by the central processing unit.

The updating progress can be logged, for example, as shown in FIG. 2. In the figure, it can be seen that 12 complete buffer contents have been transmitted. The lighting bus users 2, 6 and 7 have already positively confirmed the writing of the corresponding blocks. Since transmission of the blocks for the seventh buffer filling, no further confirmations have come back from lighting bus user 3 (this may be an indication that the corresponding lighting bus user has been separated from the bus). In the case of lighting bus user 5, only negative confirmation messages are received since the fifth buffer filling (this may indicate communication problems). Lighting bus user 7 has sent a negative confirmation at the sixth and ninth buffer filling (this may point to a checksum error).

The lighting bus users with incorrectly transmitted blocks can be placed again into the boot loader mode individually or in groups after conclusion of the updating process in order to make a further attempt to transmit the blocks again for which negative messages or no messages at all have been transmitted to the control software.

The logging information can be stored so that in the case of a collapse of the control software, the progress of the updating can be established again without additional bus communication.

If a lighting bus user should fail during the updating process, the updating can be resumed as follows:

Special attention should be paid to the fact that the control software can restore the update identification for the software update. To achieve this, the control software places a lighting bus user which is selected for the updating back into the boot loader mode when it reports with a corresponding message at the control software due to faulty firmware. In this context, the control software transmits the update identification to the corresponding device whereupon the latter participates again in the updating process. Blocks not transmitted to the lighting bus user (which have been "missed", for example, due to being placed into the boot loader mode again) are sent out again after conclusion of the first updating process as described above.

Figure 3:
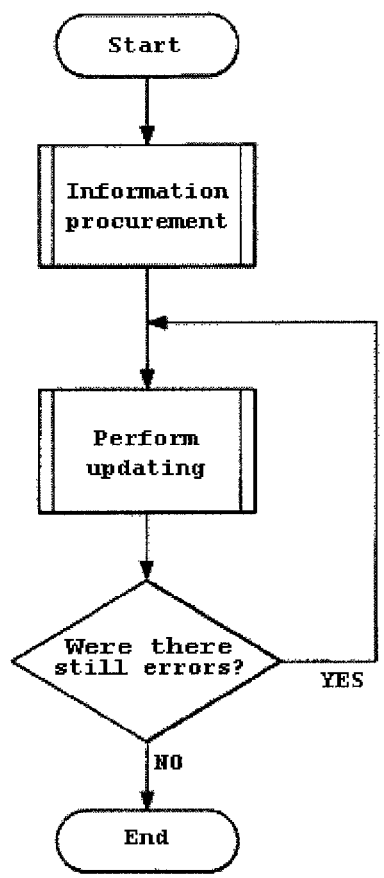
FIG. 3 shows a rough flowchart for the method according to the invention.
Figure 4A:
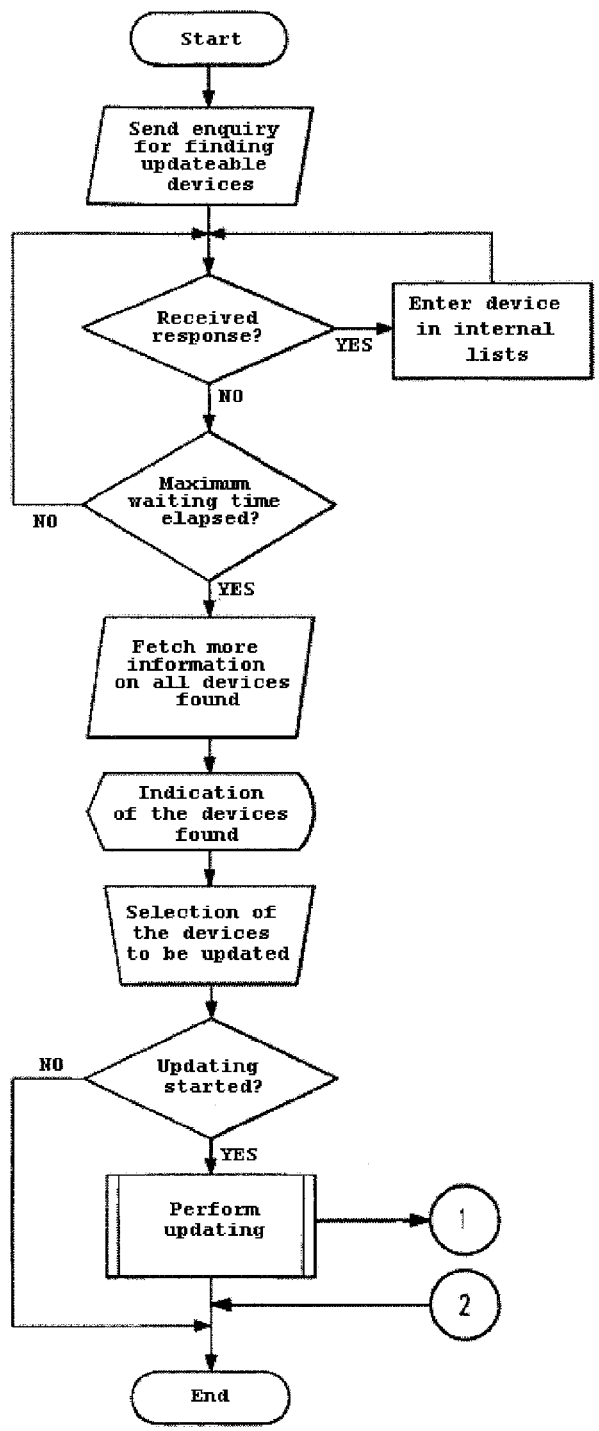
FIG. 4a shows a more detailed flowchart representation of the method according to the invention from the point of view of the central processing unit.
Figure 4B:
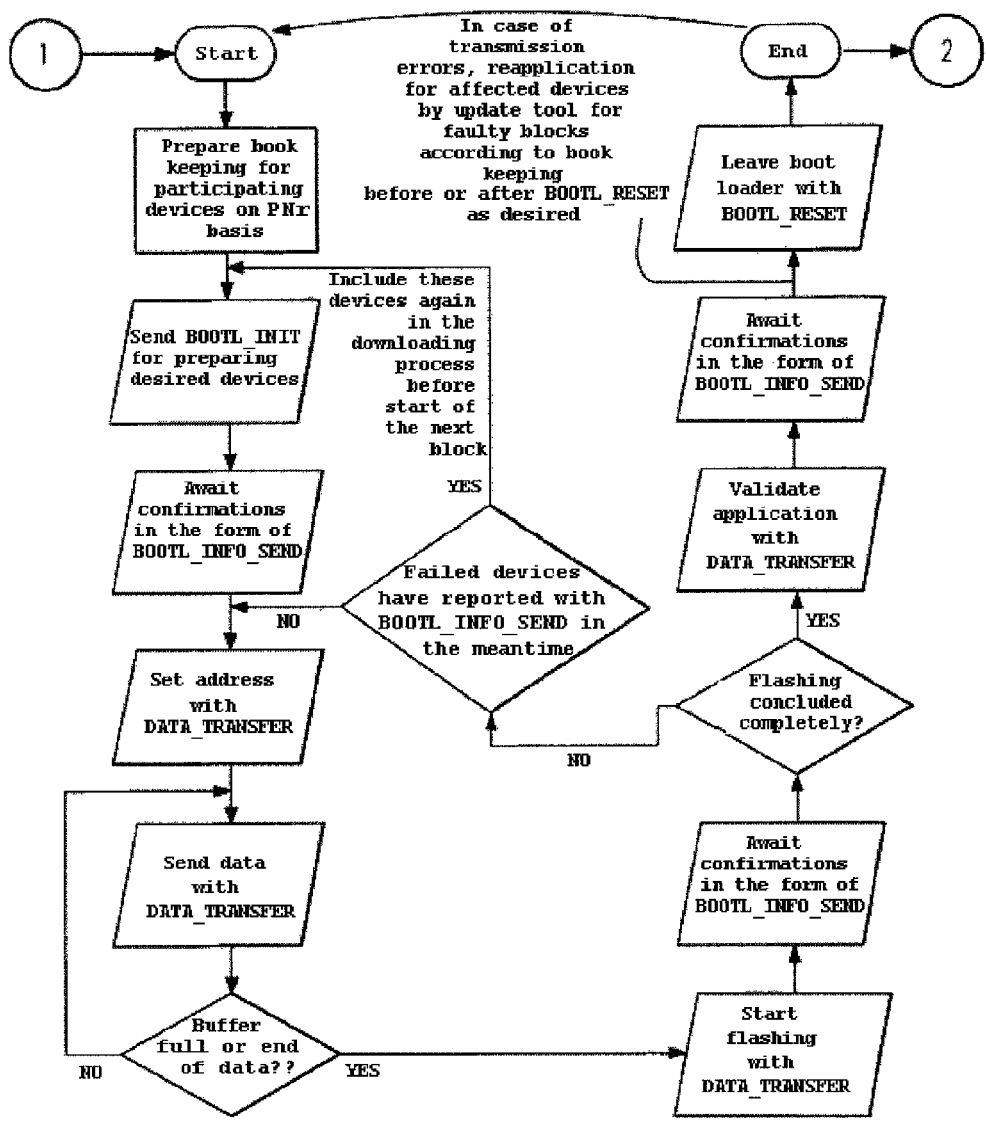

In this context, it must be understood naturally that the update software which is transmitted to a lighting bus user does not need to be written sequentially into the intended memory but can also be written incoherently in accordance with the transmitted blocks. It is only when all blocks have been transmitted successfully and written into the memory that the new update software is present completely and coherently. FIG. 3 diagrammatically shows a corresponding updating process. FIG. 4a diagrammatically shows the updating process from the point of view of the control software/central processing unit. FIG. 4b describes more precisely how the step of updating proceeds.

In order to be able to start a boot loader at any time by means of a corresponding command and to be able to determine information via the boot loader, various services must be provided by the firmware. These are, for example:

| Service | Purpose |
| --- | --- |
| Polling the version number of the boot loader etc. | Enables questions for the version of the boot loader to be answered. |
| Starting the boot loader | Enables changing into the boot loader mode |
| Restarting device without memory protection | This service is required, among other things, for enabling boot loader update software to update the boot loader. After setting a special marking (magic number) in the RAM, the boot loader will not activate the temporary memory protection after a reset so that an update of the boot loader becomes possible. In this context, there are various memory areas which can be unlocked independently of one another. |

Furthermore, the firmware/update software must be able to transfer parameters to the boot loader. The problem is here that, for starting the boot loader, a reset of the lighting bus user must be performed. Persistent storage of such parameters, e.g. in an EEPROM, is not appropriate, however, since this requires an EEPROM driver to be integrated in the boot loader which enlarges it. For this reason, a transfer via, e.g., the RAM memory is provided. This transfer can take place as described in the text which follows:

the firmware/update software writes certain parameters to predetermined memory addresses, after that the firmware/update software triggers a reset (software reset), the boot loader starts and detects that the restart occurs in consequence of an explicitly triggered reset (software reset) with other reset causes, the content of the memory is ignored), the boot loader reads the corresponding parameters out of the RAM and resets it immediately thereafter.

A persistent storage of the update identification also has the disadvantage that this requires storage space and, in the case of storage in an EEPROM, an additional corresponding driver would be required in the boot loader. In addition, the update identification could already be outdated when the device is restarted. In the worst case, further software updating with a reused update identification could be in progress which is not intended for the device at all. Administration of the update identification by the control software is to be preferred, therefore.

In order to ensure reliable updating, various safety mechanisms are provided. Firstly, the boot loader must be started with each start of the lighting bus user for which purpose corresponding vectors must be suitably set in the memory. Starting the boot loader provides the option in the case of defective firmware/update software to be able to take the device into operation again by means of a software update.

To ensure that a lighting bus user operates faultlessly, the firmware/update software used must be in a faultless state. The boot loader therefore checks the consistency of the firmware/update software with each start. For this purpose, a particular place in the memory can be provided with a signature, for example, via a simple arithmetic checksum or a complete checksum can be compared or determined for the firmware/update software (CRC). If in the case of a successful check of the firmware/update software, that is to say in the case of a firmware/update software correct according to checksum, an error should occur, nevertheless, it is provided that the boot loader uses a watchdog of the processor in order to register a faulty loading process of the firmware/update software.

It must also be checked whether a software update is intended for a lighting bus user at all. The boot loader must therefore be able to evaluate whether a software update is intended for it. For this purpose, the header mentioned above is provided in the update software which contains the precise type of the lighting bus user including any hardware revisions. The boot loader then assesses whether it is allowed to perform the update on the basis of a comparison of the header with device-specific information.

In order to initiate a software update also from normal operation, the firmware/update software must have a possibility of starting the boot loader after a corresponding request has been received by it. The firmware/update software sets, for example, a flag in the memory and activates the boot loader by a watchdog reset. The flag is then evaluated on starting and prevents the boot loader from starting the firmware/update software; rather, it waits for further boot loader commands, instead. If operable firmware/update software is present, the boot loader can be left again by means of a particular command.

If firmware/update software is not capable of starting a boot loader, the boot loader will still load the firmware/update software when this is indicated as faultless, for example due to a checksum.

In order to prevent constant loading of firmware/update software determined to be faultless but still being faulty, it is provided that the boot loader waits for an initialization command for a predetermined time during the starting process. If the boot loader receives an initialization command during this time, it will not start the firmware/update software but changes into the boot loader mode. If no initialization command is received, the firmware/update software is started normally. So that the predetermined time does not elapse uselessly, it is also provided to form a checksum at the same time for checking the consistency of the firmware/update software during this time. A predetermined delay can be, for example, 1-3 seconds.

Additional safety during the transmission is achieved due to the fact that the data sent out are provided with a sequence number. This avoids wrong allocations or transpositions. In addition, the data and the blocks transmitted are secured with a checksum (CRC). Furthermore, the update software integrity is secured and controlled by a checksum (CRC, CRC32).

It may also be provided to secure permanent checking of the firmware/update software by cyclically forming a checksum.

An update of the actual boot loader may also be provided. Since a boot loader update is particularly critical and the lighting bus user becomes unusable in the case of a boot loader update which has been faulty, the following update mechanisms are provided:

Firstly, boot loader update software is transmitted and written into the memory of the lighting bus user as is described above for update software. The boot loader update software checks after a restart whether it is faultless itself and is in a correct state. After that, the boot loader update software sets a starting address, the starting vector, so that it is started itself after a restart of the device. After the start of the boot loader update software, the latter rewrites the boot loader and checks whether it has been written faultlessly and correctly. After that, the boot loader update software resets the starting vector so that the boot loader is started with a new device start. When it has been ensured (for example by watchdog resets) that the boot loader is functioning, the boot loader update software can render itself unusable.

APPENDIX 1

Glossary

CRC
Cyclic Redundancy Check, a checksum process.
See also
http://de.wikipedia.org/wiki/Cyclic Redundancy Check
Update ID
Unambiguous number for a simultaneous downloading to a number of similar devices. Up to 15 such downloads to different devices can be handled in parallel with different download IDs. (4 bits; valid range of values 1 . . . 15)
HAL
Hardware Abstraction Layer. To be as independent as possible of a particular controller version of a lighting bus user, all hardware-related accesses are encapsulated in a separate software layer. The application then accesses these low-level functionalities via defined interfaces. In the ideal case, it is then necessary to adapt only the HAL in the case of any change of a controller class, and the rest will function immediately without any further changes.
Hardware ID
Unambiguous identifier for the basic hardware of a device (e.g. 3 bytes). Must be issued essentially for each new device and possibly also any hardware version which has an influence on the software. This makes it possible to ensure that only compatible software is written to the devices.

For practical reasons, the hardware ID is formed from a module ID and the hardware status. In the case of lighting bus users having a number of module IDs, one of these is selected as basic module ID for forming the hardware ID.

RLE
Run Length Encoding. This is a simple compression technique for representing a number of repeated bytes in a space-saving manner. See also
http://de.wikipedia.org/wiki/RLE

The invention claimed is:

1. A method for programming lighting bus users comprising the steps of:
   a. determining lighting bus users by means of a central processing unit connected to the lighting users via a bus, wherein the central processing unit polls the bus for identifying the lighting bus users connected to the bus,
   b. receiving, responsive to the polling, responses from the lighting bus users, the responses including the ID of the lighting bus users, the version information of the software running on the lighting bus users and whether the software is operating correctly,
   c. classifying the lighting bus users into a plurality of lighting bus user groups based on the responses,
   d. selecting at least one lighting bus user group from the lighting bus user groups using the central processing unit,
   e. placing at least one selected lighting bus user from the selected lighting bus user group into an update mode and allocating an update identification to said at least one selected lighting bus user,
   f. transmitting update software, without performing the update, to said at least one selected lighting bus user, wherein the update software is grouped into blocks and transmitted block-by-block to said at least one selected lighting bus user,
   g. transmitting a separate request for scheduling the update to said at least one selected lighting bus user,
   h. in response to the transmitted request, scheduling a time for updating the software on said at least one selected lighting bus user, and
   i. receiving confirmation message about successful writing of the update software from said at least one selected lighting bus user.

2. The method as claimed in claim 1, wherein it is determined whether the update software has been transmitted faultlessly.

3. The method as claimed in claim 1, wherein said at least one selected lighting bus user is placed into an operating mode as soon as the update software has been transmitted faultlessly and written completely.

4. The method as claimed in claim 1, wherein said at least one selected lighting bus user is operated in the update mode by a boot loader.

5. The method as claimed in claim 1, further comprising the steps of determining whether the update software/update software blocks has/have been transmitted faultlessly and logging a result of the determination for each selected lighting bus user.

6. The method as claimed in claim 1, further comprising the step of retransmitting after conclusion of the transmission of the entire update software, the update software or the update software blocks to the lighting bus users for which a transmission has been logged which was not faultless or did not take place.

7. The method as claimed in claim 1, wherein said at least one selected lighting bus user is programmed in a time-controlled manner.

8. The method as claimed in claim 1, wherein the selecting step is conducted in accordance with type, hardware version and/or position/mounting location.

9. The method as claimed in claim 1, wherein an update identification is assigned to each lighting bus user group.

10. The method as claimed in claim 9, wherein said update software is transmitted for each lighting bus user group.

11. The method as claimed in claim 1, wherein the transmitted update software/update software blocks for the lighting bus user are written into a buffer of the lighting bus user and the buffer accommodates at least more than one update software block.

12. The method as claimed in claim 1, wherein all update software blocks present in a buffer of said at least one selected lighting bus user are written into an update software memory.

13. The method as claimed in claim 12, wherein all update software blocks present in the buffer are written into the update software memory before new update software blocks are received.

14. The method as claimed in claim 1, wherein, after writing the update software, which comprises a plurality of blocks, or one or more update software blocks, a message about the success of the writing is transmitted to the central processing unit.

15. The method as claimed in claim 1, wherein a boot loader of the lighting bus user checks a faultlessness of the update software by determining and/or comparing a checksum, after successful writing of all update software blocks.

16. A system comprising a lighting bus user, the lighting bus user comprising:
a second memory area for accommodating update software; and
a first memory area in which a boot loader is stored, the boot loader configured to:
receive data via a bus from a central processing unit, the central processing unit configured to:
classify the lighting bus user into a group of lighting bus users based on the data transmitted; and
allocate, while the lighting bus user is in an update mode, an update identification to the boot loader;
transmit data via the bus;
in response to a poll received, transmit to the central processing unit, an identification of the lighting bus user, the version information of the software running on the lighting bus user and whether the software is operating correctly;
receive a specific signal from the central processing unit, and upon receipt of the specific signal, change the lighting bus user to the update mode;
receive an update software from the central processing unit and to accommodate the update software in the second memory area without performing the update wherein the update software is grouped into blocks;
receive a separate request for writing the update software, and in response to receiving said separate request, write the update software; and
transmit a confirmation message about successful writing of the update software into the second memory area.

17. The system as claimed in claim 16, wherein the boot loader determines by means of the update identification, a hardware ID and/or on the basis of other parameters whether received update software/received update software blocks is/are intended for the lighting bus user.

18. The system as claimed in claim 16, wherein the boot loader checks whether the update software has been received faultlessly.

19. The lighting bus user as claimed claim 16, wherein the boot loader transmits a message to the central processing unit which indicates a non-faultless transmission of the update software.

20. A computer-based central processing unit connected to a plurality of lighting bus users via a bus, wherein the central processing unit is configured to
a. execute control software,
b. determine lighting bus users via a bus, wherein the central processing unit polls the bus for identifying the lighting bus users connected to the bus,
c. receive, responsive to the polling, responses from the lighting bus users, the responses including the ID of the lighting bus users, the version information of the software running on the lighting bus users and whether the software is operating correctly,
d. classify the lighting bus users into a plurality of lighting bus user groups based on the responses,
e. select at least one lighting bus user group from the lighting bus user groups,
f. place at least one selected lighting bus user from the selected lighting bus user group into an update mode and allocate an update identification to said at least one selected lighting bus user,
g. transmit update software, without performing the update, to said at least one selected lighting bus user, wherein the update software is grouped into blocks and transmitted block-by-block to said at least one selected lighting bus user,
h. transmit a separate request for scheduling the update to said at least one selected lighting bus user,
i. in response to the transmitted request, schedule a time for updating the software on said at least one selected lighting bus user, and receive confirmation message about successful writing of the update software from said at least one selected lighting bus user.

21. The computer-based central processing unit as claimed in claim 20, which is also configured for receiving messages about the transmission of the update software.

22. The computer-based central processing unit as claimed in claim 20, which is also configured for logging messages about the transmission of the update software.

23. The computer-based central processing unit as claimed in claim 20, which is also configured for placing said at least one selected lighting bus user into an operating mode after successful transmission of the update software blocks of the update software.

24. The computer-based central processing unit as claimed in claim 20, which is also configured for retransmitting unsuccessfully transmitted update software/update software blocks to said at least one selected lighting bus user.

25. The computer-based central processing unit as claimed in claim 20, wherein the update software is transmitted in a time-controlled manner.

26. The computer-based central processing unit as claimed in claim 20, wherein the computer-based central processing unit assigns another update identification to each lighting bus user group.

27. The computer-based central processing unit as claimed in claim 26, wherein the computer-based central processing unit transmits update software for each lighting bus user group.

* * * * *